United States Patent [19]

Newton et al.

[11] 4,324,752
[45] Apr. 13, 1982

[54] PROCESS FOR PRODUCING A FUSED FABRIC

[75] Inventors: Richard C. Newton; Gerald A. Romanek, both of Greenville, S.C.

[73] Assignee: Phillips Petroleum Company, Bartlesville, Okla.

[21] Appl. No.: 108,440

[22] Filed: Dec. 31, 1979

Related U.S. Application Data

[60] Continuation of Ser. No. 905,072, May 11, 1978, abandoned, which is a division of Ser. No. 797,213, May 16, 1977, Pat. No. 4,105,484.

[51] Int. Cl.³ .............................................. H05B 1/00
[52] U.S. Cl. ...................................... 264/25; 264/126; 264/288.8; 264/522; 264/288.4
[58] Field of Search .................... 264/25, 126, 288

[56] References Cited

U.S. PATENT DOCUMENTS 4,042,655 8/1977 Platt et al. ............................. 264/25
4,076,071 2/1978 Rosenkranz et al. ................. 264/25

Primary Examiner—Donald E. Czaja
Assistant Examiner—James R. Hall

[57] ABSTRACT

In a process for producing a fused fabric a fluid is passed in contact with the surface of a fabric on the surface opposite that exposed to sufficient infrared radiation to fuse at least a portion of the synthetic thermoplastic fibers which comprise at least a portion of the fabric.

12 Claims, 2 Drawing Figures

PROCESS FOR PRODUCING A FUSED FABRIC

This is a continuation of application Ser. No. 905,072, filed May 11, 1978 which is a division of Ser. No. 797,213 filed May 16, 1977, now U.S. Pat. No. 4,105,484, issued Aug. 8, 1978.

BACKGROUND OF THE INVENTION

The present invention relates to a fused fabric and a method suitable for producing a fused fabric.

It is frequently desirable to fuse together at least a portion of the fibers of a fabric. Such fabrics comprise at least a portion of synthetic thermoplastic fibers which melt and bond to adjacent fibers when the fibers are subjected to sufficient heat. The fabric may be a woven, knitted or nonwoven fabric; however, the fabric most often fused is the nonwoven fabric. A variety of techniques are known in the art for fusing the fabrics noted above, such as by contacting such fabrics with heated rolls, hot fluids such as air, etc. More recently infrared radiation has been used to fuse various fabrics. While infrared radiation has proven to be a useful fusion technique, it is difficult to control, particularly when the weight or thickness of fabric being fused is not uniform. Thus, there is a need to improve infrared fusion processes in general. Further there is a need to improve infrared fusion processes for fusing nonuniform fabrics.

An object of the invention is the infrared fusion of fabrics.

Another object of the invention is the infrared fusion of fabrics in which control of the degree of fusion is substantially improved as compared to the prior art.

According to the process of the invention a fabric, at least a portion of which comprises synthetic thermoplastic filaments, is contacted with a fluid on one surface and simultaneously the other surface is exposed to infrared radiation so that at least a portion of the synthetic thermoplastic fibers is fused together. This process produces a fused fabric having an improved uniform appearance and a soft hand even in areas of the fabric in which the weight is relatively nonuniform.

BRIEF DESCRIPTION OF THE DRAWINGS

In order to provide a better understanding of the invention a drawing is attached hereto in which.

DETAILED DESCRIPTION OF THE INVENTION

Figure 1:
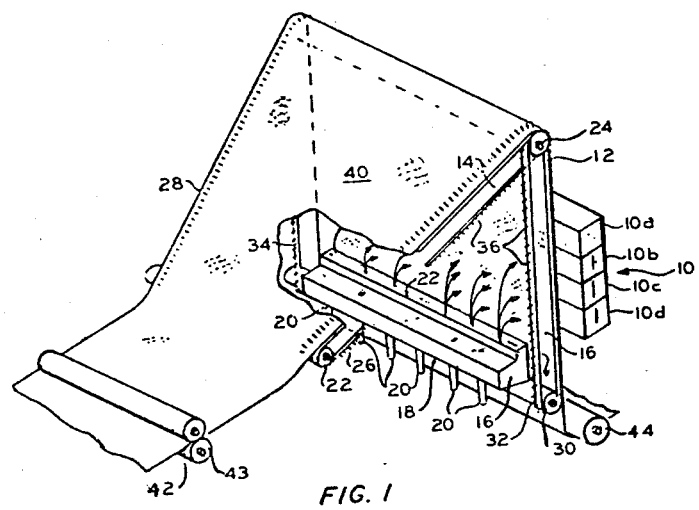
FIG. 1 shows a perspective view partially cutaway of one embodiment of an apparatus suitable for practicing the process of the invention.

Again referring to FIG. 1, an infrared heating means indicated generally by reference numeral 10 comprises four infrared heaters 10a, 10b, 10c and 10d. Although only one infrared heater is necessary to practice the invention, a group of heaters can be used as shown in the drawing. It has been found that the foil type electric heaters produce good results, although any type infrared heater can be employed including those using gas or similar fuels instead of electricity.

The infrared heating means 10 is positioned adjacent to and spaced a distance from a conveying means 12 having an expanding width section 14 and an essentially constant width section 16. A conveying means having an expanding width section 14 and a constant width section 16 is frequently referred to as a tenter frame and these are often used for transporting nonwoven fabrics; however, most any conveying means suitable for transporting a fabric can be used whether it contains an expanding width section or not provided the fabric is transported so that the two surfaces of the fabric are unrestricted and exposed simultaneously. The expanding width section of conveying means 12 comprises rolls 23 and 24 and belts 26 and 28. Belts 26 and 28 have a plurality of pins 36 attached thereto extending outwardly so that they can grasp the edges of fabric 40 passed to conveying means 12 via guide rolls 42, 43, and thus expose both surfaces of fabric 40 simultaneously since both surfaces are unrestricted. The constant width section 16 of conveying means 12 comprises roll 24, which is also a part of the expanding width section 14 described above, roll 30 and belts 32 and 34 also having pins 36 attached thereto and extending outwardly. Fabric 40 then passes under roll 44 to a suitable rollup device as known in the art. Roll 30 and/or roll 24 are usually driven by a suitable power source (not shown).

In addition to infrared heating means 10 and conveying means 12, the apparatus also comprises a fluid-contacting means 17. In FIG. 1, the fluid-contacting means 17 comprises an elongated enclosure 18 having six inlets 20 connected to a source of pressurized fluid such as compressed air and an outlet 22. In this embodiment outlet 22 comprises four elongated openings or slots. It is desirable that each elongated opening be fitted with vanes or a damper so that the direction and flow of the fluid can be regulated. Such vanes or dampers are well known in the art and are marketed commercially. For example, good results were obtained employing a commercial air diffusion device known as a Titus MODU-Linear manufactured by the Titus Mfg. Corp., Waterloo, Iowa. Four Model ML-3400 MODULinears were employed for the four elongated openings 22 shown in FIG. 1.

Figure 2:
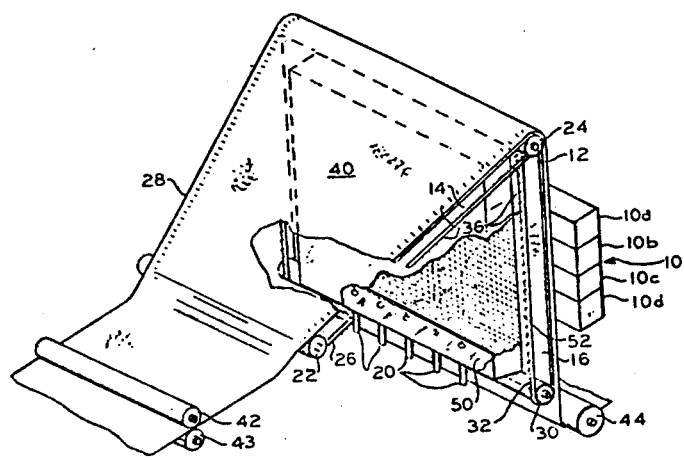
FIG. 2 shows a perspective view partially cutaway of another embodiment of an apparatus suitable for practicing the process of the invention.

The apparatus shown in FIG. 2 is very similar to that shown in FIG. 1; the only difference being that the fluid-contacting means 50 of FIG. 2 comprises a chamber having a perforated or porous flat surface such as screen 52 and the fluid entering the chamber of fluid-contacting means 50 via inlets 20 is dispersed and exits the chamber through the perforations in screen 52.

In the operation of the apparatus shown in FIG. 1, a fabric 40 is passed to conveying means 12 through guide rolls 42 and 43 and the edges of the fabric are grasped by the pins 36 in belts 26 and 28. As the distance between belts 26 and 28 becomes greater, fabric 40 is stretched in a direction normal to the direction of movement of the fabric. Fabric 40 then passes over roll 24 and is grasped by pins 36 in belts 32 and 34. As fabric 40 passes beyond roll 30, it passes under roll 44 and then to a suitable roll-up device it is further processed as desired.

As fabric 40 passes between rolls 24 and 30, one side of fabric 40 is exposed to infrared radiation by infrared heating means 10 positioned adjacent to and spaced a distance from fabric 40 and the constant width section 16 of conveying means 12. Also as one side of fabric 40 is being exposed to infrared radiation, the other side is simultaneously contacted with a fluid, such as air, as indicated by the arrows shown in FIG. 1. Although the temperature of the fluid can be selected over a relatively broad range, generally the temperature of the fluid is at ambient temperature for most purposes of this invention and air is used as the fluid.

In FIG. 2, the operation of the apparatus is essentially the same as for the apparatus of FIG. 1. In FIG. 2 the fluid, such as air, entering the chamber of fluid contacting means 50 through a plurality of inlets 20 connected to a suitable source of compressed air, not shown, exits the chamber through the perforations in screen 52 as indicated in the drawing. Thus, the primary difference between the two embodiments of the invention as shown in FIGS. 1 and 2 is that in FIG. 1 the air is directed toward the surface of fabric 40 at an acute angle relative to the surface of fabric 40 whereas in FIG. 2 the air is directed essentially perpendicular to the surface of fabric 40; but in either case an air pressure differential is created across the fabric which causes the air to pass through the fabric. In fabrics that are not uniform and have thick and thin spots, a larger volume of air moves through the thin spots which prevents the infrared radiation from overfusing these areas and that in turn produces a more uniform-appearing fabric.

As shown in FIG. 1, the air contacting fabric 40 is directed upwardly and generally in a countercurrent direction to the movement of fabric 40, striking the fabric at an acute angle i.e., across the width of the fabric 40; however, fluid-contacting means 17 can be positioned near roll 24 so that air can be directed concurrent to the direction of the movement of fabric 40 (not shown). Also it is possible to use two fluid-contacting means 17 as shown in FIG. 1 by positioning one such means near roll 24 and one near roll 30 as shown in FIG. 1. Further, a plate can be used positioned adjacent fluid-contacting means 17 on the side of the fluid-contacting means 17 opposite fabric 40 and extending parallel with the surface of fabric 40 contacted with fabric. The use of such a plate restricts and contains the fluid near the surface of fabric 40 which helps to induce a pressure differential across the fabric.

When using a tenter frame as the conveying means 12 as shown in FIGS. 1 and 2, the fabric 40 is stretched in a direction normal or perpendicular to the direction of movement of the fabric and the fabric is stretched immediately prior to, during and immediately after fusing at least a portion of the synthetic thermoplastic fibers together.

Fabrics suitable for use in the invention include, for example, woven, knitted and nonwoven fabrics in which at least a portion of the fibers comprising the fabric are synthetic thermoplastic fibers. It is envisioned that the invention will find the greatest application fusing synthetic thermoplastic nonwoven fabrics and it is with these fabrics that the invention has been tested and found to produce very good results. Such nonwoven fabrics are well known in the art and are produced by various well-known techniques such as for example air laying fibers or carding and crosslapping fibers to produce a batt followed by fusing, or the batt can be needled prior to fusing.

Most any synthetic thermoplastic filaments or fibers can be used in fabrics fused according to the invention such as for example polyolefins, polyamides, polyesters and mixtures thereof. A polypropylene nonwoven fabric was fused using the present invention with very good results.

It is pointed out that the quantity and velocity of fluid required which is contacted with the surface immmediately opposite the surface being fused depend upon a number of variables and for that reason only general guidelines are provided along with the specific example described below. The most important variables to be considered are the type and temperature of contacting fluid, which for most applications will be ambient air; the weight of the fabric to be fused and the relative nonuniformity, that is, the greater the nonuniformity the greater quantity of contacting fluid required; the speed at which the fabric is moving, the higher the speed the greater the quantity of contacting fluid required; the distance the infrared heating means is positioned from the surface of the fabric and the temperature of the infrared heating means; the type of synthetic thermoplastic fiber used in the fabric; and the angle of impingement of the fluid on the surface of the fabric, generally a lower flow rate of fluid is required when the fluid is directed normal to the surface of the fabric as compared to when the fluid is directed at an acute angle to the surface of the fabric.

EXAMPLE

In a specific example, a nonwoven web weighing about 3.1 oz/yd (73.47 gm/sq meters) made of $3\frac{1}{4}''$ (8.89 cm), 3 denier polypropylene staple fibers was fused in accordance with the invention. The fabric was supported on a tenter frame about 5'6'' (1.67 meters) wide in a manner as shown in FIG. 1. Four 4100 watt infrared heaters, Leeco Speed Foil Heaters manufactured by Joyal Industries, Inc., Coventry, R.I., were operated at 440 volts. The line speed was 30 FPM (9.14 m/m).

The plenum chamber for forcing air in contact with the surface of the fabric opposite the heaters was 10'' (25.4 cm) wide, 10'' high, and 5'0'' (1.52 meters) long having four slots 1'' (2.54 cm) wide and 5'0'' (1.52 meters) long positioned adjacent one another with the first slot 1'' (2.54 cm) from the fabric similar to that shown in FIG. 1. The slots were equipped with Titus Model ML-3400 MODULinears noted above. The first two slots were adjusted to direct air toward the fabric with the two outer slots fully dampered. Air was provided to the bottom of the chamber by six 3'' (7.62 cm) diameter inlets connected to a blower which delivered air at an average of 503 CFM (14.24 $M^3/M$) and at an average velocity of 940 FPM (286.5 m/m) from the slots. The fabric obtained had a substantially uniform appearance on both sides of the fabric and the side opposite the heaters had a uniform fuzzy texture and a soft hand.

Additional fabric was produced with the air supply turned off. The appearance of this fabric indicated a noticeable loss in fabric uniformity apparently because there was a lack of fuzz in some areas on the side opposite the heaters as compared to the fabric produced in accordance with the invention described above. The fabric also possessed a harsh hand.

That which is claimed is:

1. A process for the controlled fusing of at least a portion of the synthetic thermoplastic fibers in an unfused fabric, having a first and second surface, to produce a fused fabric having a uniform appearance and a soft hand, said process comprising the steps of:

exposing a portion of the first surface of said unfused fabric to infrared radiation to thereby fuse at least a portion of said synthetic thermoplastic fibers together; and directing a fluid towards a portion of the second surface of said unfused fabric, which is directly opposite the portion of the first surface of said unfused fabric which is exposed to said infrared radiation, in such a manner that at least a portion of said fluid passes completely through said unfused fabric so as to prevent overfusing of said synthetic thermoplastic fibers by said infrared radiation, the exposing of a portion of the first surface of said unfused fabric to said infrared radiation occurring simultaneously with the directing of said fluid towards the portion of the second surface of said unfused fabric.

2. A process in accordance with claim 1 wherein said unfused fabric is a non-uniform fabric having varying thicknesses and wherein the flow of said fluid is greater through the thinner areas of said unfused fabric than through the thicker areas of said unfused fabric to substantially prevent said infrared radiation from overfusing the synthetic thermoplastic fibers in the thinner areas of said unfused fabric.

3. A process in accordance with claim 1 wherein said unfused fabric is a nonwoven fabric.

4. A process in accordance with claim 1 wherein said synthetic thermoplastic fibers are selected from the group consisting of polyolefins, polyamides, polyesters and mixtures thereof.

5. A process in accordance with claim 1 wherein said unfused fabric is a polypropylene nonwoven fabric.

6. A process in accordance with claim 1 wherein said fluid is air at ambient temperature.

7. A process in accordance with claim 6 wherein the air is directed toward said first surface of said unfused fabric at an acute angle relative to said first surface.

8. A process in accordance with claim 6 wherein the air is directed in an essentially perpendicular direction relative to said first surface.

9. A process in accordance with claim 8 wherein said unfused fabric is stretched at least in a first direction immediately prior to, during and immediately after fusing said synthetic thermoplastic fibers.

10. A process in accordance with claim 9 wherein said unfused fabric is a polypropylene nonwoven fabric having been previously produced by crosslapping webs of polypropylene staple and needling the webs together.

11. The fused fabric produced according to the process of claim 10.

12. The fused fabric produced according to the process of claim 1.

* * * * *